United States Patent [19]

Clarke

[11] 4,275,180

[45] Jun. 23, 1981

[54] POLYMER COMPOSITIONS

[75] Inventor: Raymond Clarke, Mountain View, Calif.

[73] Assignee: Raychem Limited, London, England

[21] Appl. No.: 894,511

[22] Filed: Apr. 7, 1978

[30] Foreign Application Priority Data

Apr. 12, 1977 [GB] United Kingdom ............... 15122/77

[51] Int. Cl.$^2$ ............................................. C08L 67/06
[52] U.S. Cl. ............................... 525/173; 204/159.15; 204/159.16; 204/159.19; 428/458; 428/463; 525/176
[58] Field of Search ................ 260/873; 525/173, 176; 204/159.15, 159.16, 159.19

[56] References Cited

U.S. PATENT DOCUMENTS

| | | | |
|---|---|---|---|
| 3,763,109 | 10/1973 | Witsiepe | 260/75 R |
| 3,766,146 | 10/1973 | Witsiepe | 260/75 R |
| 3,784,520 | 1/1974 | Hoeschele | 260/75 R |
| 3,963,801 | 6/1976 | Su | 260/873 |
| 3,963,802 | 6/1976 | Shih | 260/873 |
| 3,968,015 | 7/1976 | Nyberg | 204/159.15 |
| 3,988,388 | 10/1976 | Alberts et al. | 260/862 |
| 4,002,581 | 1/1977 | Dolce | 260/873 X |
| 4,010,222 | 3/1977 | Shih | 260/873 |
| 4,020,126 | 4/1977 | Gander et al. | 260/873 |
| 4,022,748 | 5/1977 | Schlicting et al. | 260/873 X |
| 4,113,594 | 9/1978 | Nyberg | 204/159.15 |

FOREIGN PATENT DOCUMENTS

| | | |
|---|---|---|
| 1010064 | 11/1965 | United Kingdom . |
| 1025040 | 4/1966 | United Kingdom . |
| 1053651 | 1/1967 | United Kingdom . |
| 1151386 | 5/1969 | United Kingdom . |
| 1241168 | 7/1971 | United Kingdom . |
| 1280730 | 7/1972 | United Kingdom . |
| 1295480 | 11/1972 | United Kingdom . |
| 1358059 | 7/1974 | United Kingdom . |
| 1431586 | 4/1976 | United Kingdom . |
| 1433129 | 4/1976 | United Kingdom . |
| 1455513 | 11/1976 | United Kingdom . |

*Primary Examiner*—Melvyn I. Marquis
*Attorney, Agent, or Firm*—Lyon & Lyon

[57] ABSTRACT

The invention provides a polymer composition which comprises a crosslinkable or crosslinked blend of an elastomer and a thermoplastic polymer, the elastomer comprising a polymer of ethylene with an ethylenically unsaturated aliphatic ester, and the elastomer and the thermoplastic polymer being substantially free of halogen-containing substituents. The preferred compositions may be used as jacketing materials for wire and cable, as harnessing materials, and in the manufacture of heat recoverable articles having improved oil resistance and thermal ageing properties.

11 Claims, No Drawings

POLYMER COMPOSITIONS

This invention relates to polymer compositions and more particularly to polymer compositions comprising a blend of an elastomer and a thermoplastic polymer.

It has been proposed in British Pat. No. 1,010,064 to provide an article composed of an organic polymer composition comprising a crosslinked elastomer, said article being elastomeric and being in a dimensionally unstable condition capable of altering its physical form upon the application of heat alone to assume a dimensionally heat stable condition, the article in its altered heat stable form also being elastomeric. Such heat recoverable elastomeric articles have been very successful in a wide variety of applications but the compositions specifically described in the aforesaid British Patent have been found to be very expensive, or to have insufficient resistance to hydrocarbon solvents and thermal ageing under very severe conditions.

It has also been proposed in U.S. Pat. No. 3,873,494 to provide an oil resistant and ageing resistant elastomeric composition which comprises a cured blend of an ethylenecontaining polymer, for example an ethylene/acrylic ester or ethylene/vinyl acetate polymer, and a butadiene/acrylonitrile polymer. However such compositions, consisting wholly of elastomers, cannot be rendered heat recoverable to a useful extent by normal methods.

For many applications, for example in aircraft wiring and harnessing, it is also desirable that a polymer composition should not emit toxic vapours when heated, or at least that such vapours should be kept to a minimum. In such applications it is desirable that the polymers should not contain halogen atoms.

There is therefore a need for a relatively inexpensive elastomeric polymer composition having improved resistance to hydrocarbon solvents, for example diesel fuel and aviation fuel, at both ambient and elevated temperatures, that has good resistance to thermal ageing, is substantially free of halogen containing polymers and which can also be rendered heat recoverable.

The present invention provides a polymer composition which comprises a crosslinkable or crosslinked blend of an elastomer and a thermoplastic polymer, the elastomer comprising a polymer of ethylene with an ethylenically unsaturated aliphatic ester, and the elastomer and the thermoplastic polymer being substantially free of halogen containing substituents.

Preferred crosslinked blends according to the invention can have an oil uptake of 30% or less by weight and preferably less than 10% by weight when immersed in ASTM oil No. 2 at a temperature of 90° C. for 168 hrs.

As used in this specification, the term "elastomer" is intended to mean a polymeric material exhibiting a characteristic rubber-like elastic deformability under the action of comparatively small stresses, and returning substantially to its original size and shape upon the removal of the applied stress, and which has an elastic modulus in the uncrosslinked state of 30 $N/mm^2$ or less, measured at room temperature using the method of ASTM D638-72.

The term "thermoplastic polymer" as used in the specification is intended to mean any thermoplastic polymeric material that can be repeatedly softened by heating and hardened by cooling through a temperature range characteristic of the material and that in the softened state can be shaped by flow into articles by moulding or extrusion (including those materials known in the art as "thermoplastic elastomers") and which has an elastic modulus greater than 30 $N/mm^2$ measured at room temperature using the method of ASTM D638-72.

The term "crosslinked" as applied to the compositions of the present invention is intended to mean a three-dimensional molecular network having a modulus of elasticity of at least about 10 psi as measured at a temperature of 50° above the softening or flow temperature of the thermoplastic polymer. For the purpose of this definition, the modulus of elasticity is determined in accordance with the method of Black R. M.

The Electrical Manufacture, October 1957. The softening or flow temperature of the thermoplastic polymer is measured in accordance with ASTM D569-59 (1971).

The preferred elastomers for use in the present invention are ethylene/acrylic ester polymers and ethylene/vinyl acetate polymers, containing at least 3.6 moles of ethylene per 1000 grams of polymer. Examples of suitable elastomers include:

(a) An ethylene/alkyl acrylate or ethylene/alkyl methacrylate copolymer, wherein the alkyl group has 1–4 carbon atoms; the proportion of the acrylic ester being about 2.5–8.0 moles of ester groups per kilogram of the copolymer.

(b) A terpolymer of ethylene with an alkyl acrylate or methacrylate wherein the alkyl group has 1–4 carbon atoms, and a third copolymerizable monomer, which may be, for example one of the following:
 i a $C_1$–$C_{12}$ alkyl monoester of diester of a butenediolic acid,
 ii acrylic acid,
 iii methacrylic acid
 iv carbon monoxide,
 v acrylonitrile,
 vi a vinyl ester,
 vii an alkyl acrylate or alkyl methacrylate, and alkyl group having at least five carbon atoms; and
 viii maleic anhydride; or (c) Ethylene/vinyl acetate copolymers containging at least 35% by weight vinyl acetate.

In the above terpolymer the proportion of the acrylic ester is equivalent to about 2.5–8.0 moles of ester groups per kilogram of the polymer, and the proportion of the third monomer is no higher than about 10 weight percent of the polymer.

The elastomer can be a simple copolymer of ethylene with methyl acrylate, ethyl acrylate, propyl acrylate isopropyl acrylate, a butyl acrylate, methyl methacrylate, ethyl methacrylate, propyl methacrylate, isopropyl methacrylate, a butyl methacrylate or vinyl acetate. Such copolymers if not commercially available, can be made by conventional and well known methods. These copolymers should have a melt index within the range of 0.1–70 at 190° C., preferably 0.5–15 as measured by ASTM method number D-1238-52T, or the substantially equivalent method ASTM D-1238-73.

The terpolymer of ethylene with an acrylic ester and a third monomer may contain as the third monomer an ester of fumaric acid or maleic acid, wherein the alcohol moiety can be, for example, methyl, ethyl, propyl, isopropyl, various isomers of butyl, pentyl, hexyl, heptyl, octyl, nonyl, decyl, undecyl, dodecyl and the like. The third monomer may also be, among others, a vinyl ester such as for example, vinyl acetate or vinyl butyrate. It can also be an acrylic ester such as, for example, various isomeric forms of pentyl, hexyl, heptyl, octyl, nonyl, decyl, undecyl, dodecyl, pentadecyl and octadecyl acrylate and methacrylates. It is not practical to use as the third monomer an acrylic ester in which the alcohol moiety contains more than 18 carbon atoms.

Excellent results have been obtained using as the elastomer component of the polymer composition a terpolymer of ethylene, methyl acrylate and a cure-site monomer comprising carboxyl groups available from Du Pont under the trade name Vamac.

Physical properties and other details concerning this material are to be found in a brochure available from Du Pont entitled "Vamac ethylene/acrylic Elastomer-A new Class of Heat & Oil Resistant Rubber" the disclosure of which is incorporated herein by reference.

Mixtures of any of the above mentioned elastomers with each other or with other elastomers may be used where appropriate although it has been found that the presence of hydrocarbon elastomers has a deleterious effect upon the oil resistance of the polymer composition and thus these are preferably not included, or if present, are preferably incorporated in an amount of not more than 5% by weight based on the total weight of the polymer composition. Suitable thermoplastic polymers for use in the polymer compositions of the present invention include, for example, polyesters such as polyethylene terephthalate and polytetramethyleneterephthalate, polyamides such as nylon 6,6, nylon 11 and nylon 12, copolymers of olefins and unsaturated polar monomers for example vinyl acetate, vinyl propionate and higher esters, containing less than 25% by weight of the unsaturated ester, ionomers such as Surlyn (an ionomer based on a copolymer of ethylene and methacrylic acid manufactured by Du Pont), and polyethylenes, especially high density and other linear polyethylenes. An especially preferred group of thermoplastic polymers are the so-called thermoplastic elastomers, and particularly the segmented copolyester polymers consisting essentially of recurring intralinear long chain ester units and short chain ester units randomly joined head-to-tail through ester linkages, said long chain ester units being represented by the formula:

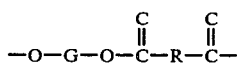

and said short chain ester units being represented by the formula:

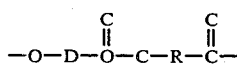

where G is a divalent radical remaining after the removal of terminal hydroxyl groups from at least one long chain glycol having a molecular weight of about 600-6000; R is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250.

Exemplary of the preferred segmented copolyester polymers are the segmented polyether ester copolymers derived from terephthalic acid, polytetramethylene ether glycol and 1,4-butanediol. These are random block copolymers having crystallizable hard blocks with the repeating unit

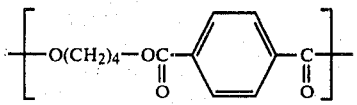

and amorphous, elastomeric polytetramethylene ether terephthalate soft blocks of the repeating unit

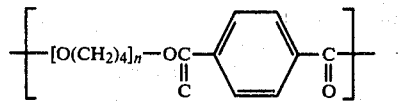

having a molecular weight of from about 600-3000, i.e. n=6-40. Such polymers are commercially available from the Du Pont Co, under the registered trademark "Hytrel". Pertinent information regarding their structure, properties and methods of preparation are to be found in U.S. Pat. Nos. 3,023,192, 3,651,014, 3,763,109, 3,766,146 and 3,784,520 and in Belgian Pat. No. 793,332, the disclosures of which are incorporated herein by reference. Additional information is found in "Segmented Polyether Ester Copolymers-A-New Generation of Thermoplastic Elastomers" by G. K. Hoeschele published by the Elastomers Department E. I. Du Pont De Nemours, Inc., Wilmington, De., and references cited therein, all of which are also incorporated by reference.

Mixtures of any of the above thermoplastic polymers may be used where appropriate.

It is believed to be advantageous for the solubility parameter of the elastomer to be greater than 9, and, in advantageous compositions according to the invention, it is further preferred that the solubility parameters of the elastomer and the thermoplastic polymer should be similar, e.g. they will differ by not more than 0.5, preferably by not more than 0.25.

For the purposes of this specification, solubility parameter is defined as that measured by the method of Brandrup & Immergut, Polymer Handbook Chapter 4 page 340 (2nd Edition) and is expressed as $(cals/cm^3)^{\frac{1}{2}}$.

Some types of polymer materials inherently have a solubility parameter greater than 9 whereas others can have solubility parameters greater than or less than 9 depending on their precise chemical composition. Still others, of course, have solubility parameters which are inherently less than 9.

However, tables of solubility parameter values are published for example in the above-mentioned Polymer Handbook and the skilled worker will have no difficulty in selecting polymeric materials having the appropriate solubility parameters for use in the present invention.

The elastomer and the thermoplastic polymer may be blended in a wide range of proportions depending upon the physical requirements of the polymer composition. Preferred compositions will however contain the elastomer and the thermoplastic polymer in a weight ratio of from 4:1 to 1:4 and most preferably in a ratio of from 2.5:1 to 1:2.5. Particularly good results have been obtained using a blend of an ethylene/acrylic ester elastomer and a segmented copolyester thermoplastic polymer in the proportions of from 50 to 150 parts by weight of the ethylene/acrylic ester elastomer per 100 parts by weight of the segmented copolyester.

As previously stated, the polymer compositions are substantially free of halogen containing polymers. Desirably the concentration of halogen atoms in the composition is less than 5% by weight, and preferably less than 1% by weight.

In addition to the polymer compositions the blends of the present invention may comprise additional conventional additives, for example, fillers, ultra violet stabilisers, antioxidants, acid acceptors, anti-hydrolysis stabilisers and colourants, in minor proportions e.g. in amounts of usually not more than 40% by weight.

The polymer compositions of the present invention may be crosslinked by any convenient method, for example by irradiation or, by chemical crosslinking using, for example, a peroxide. Suitable peroxides are those that decompose rapidly within the range of 150° C.–250° C. These include, for example, dicumyl peroxide, 2,5-bis(t-butylperoxy)-2,5-dimethylhexane, and $\alpha,\alpha$-bis(t-butylperoxy)di-isopropylbenzene. In a typical chemically crosslinkable composition there will be about 0.5–5 parts by weight of peroxide per 100 parts of polymer composition. The peroxide may be adsorbed on an inert carrier such as a calcium carbonate, carbon black, or Kieselguhr; however, the weight of the carrier is not included in the above range.

Preferably, however, the polymer compositions of the present invention are crosslinked using high energy radiation. Radiation dose levels to achieve crosslinking according to the present invention may range from about 2 to 80 Mrads or more, but a dose of about 5 to 50 Mrads is preferred. For most purposes a dose of about 8 to 20 Mrads will be effective.

In some cases it may be desirable to add to the crosslinkable polymer composition a co-agent to assist in the crosslinking reaction. Such co-agents usually contain multiple unsaturated groups such as alkyl or acrylic esters. While their mode of action is not known with certainty, it is believed that they react with the initial radical formed on the polymer backbone to form a more stable radical, which undergoes coupling reactions to form crosslinks more readily than chain scission reactions.

The co-agent can be for example, $N,N^1$-m(phenylene)-dimaleimide, trimethylolpropane trimethylacrylate, tetraallyloxyethane, triallyl cyanurate, triallyl isocyanurate, tetramethylene acrylate, or polyethylene oxide glycol dimethacrylate. The amount of the co-agent is preferably up to about 5 parts by weight per 100 parts of the polymer composition and preferably from 1 to 3 parts by weight per 100 parts of the polymer composition.

Crosslinked polymer compositions according to the present invention may be used in a wide range of applications, and the preferred compositions find particular application where resistance to hydrocarbon fluids and thermal ageing is required. Thus the compositions may be used as jacketing materials for wire and cable and as harnessing materials, particularly in automative and aeronautical applications.

Crosslinked compositions according to the invention may be used for the production of heat recoverable articles for a wide variety of purposes. A heat recoverable article is one which is in a dimensionally unstable condition and is capable of altering its physical form upon the application of heat alone to assume a dimensionally heat stable condition. Preferably the article is elastomeric in boths its heat unstable and heat stable forms. Heat recoverable articles may be produced for example by deforming an article under heat and pressure from an original dimensionally heat stable form to a dimensionally heat unstable form from which it is capable of recovery towards its original form upon the application of heat alone. Heat recoverable articles and methods for their production are described, for example in U.S. Pat. Nos. 2,027,962, 3,086,242 and 3,957,372.

In another aspect, therefore, the invention provides a heat recoverable article which comprises a polymer composition comprising a crosslinked blend of an elastomer and a thermoplastic polymer, the elastomer comprising a polymer of ethylene with an ethyenically unsaturated aliphatic ester and the elastomer and the thermoplastic polymer being substantially free of halogen containing substituents.

The invention also permits the production of certain novel heat recoverable elastomers and therefore in a still further aspect the invention provides a heat recoverable article comprising an ethylene/acrylic ester elastomer as hereinbefore described, especially an ethylene/methyl acrylate elastomer, for example Vamac, and a thermoplastic polymer.

Heat recoverable articles according to the invention may be used, for example, as sleeves for the sealing and protection of splices and terminations in electrical conductors, particularly wire and cable, and for providing an environmental seal and protection for repaired areas and joints in utility supply means such as gas and water pipes, district heating systems, ventilation and heating ducts, and conduits or pipes carrying domestic or industrial effluent.

The electrical properties of the polymer compositions may be modified by the inclusion of suitable fillers. Thus by the addition of conductive fillers, for example, carbon black, the compositions may be rendered semiconducting for use as voltage stress relieving materials in splices and terminations in high voltage electric cables. The addition of a conductive filler may also enable the polymer composition to be used as an electrical heating material, for example, in heating tapes and water bed heaters.

The invention is illustrated by the following Examples:

EXAMPLE 1

The following compositions were blended using a laboratory Banbury internal mixer (all parts are by weight):

Vamac N123 (ethylene/methyl acrylate elastomer) (solubility parameter 9.1): 123
Carbon black: 21
Antimony trioxide: 15
Dechlorane Plus 25 (highly chlorinated flame retardant): 15
Crodamine IHT (release agent): 3
Triallyl cyanurate: 4
Thermoplastic polymer: 60

The following thermoplastic polymers were used in the formulations:
Hytrel 4055—block copolymer of polytetramethylene ether with poly (tetramethyleneterephthalate)
  Solubility parameter 9.3
DPD 6181—ethylene/ethyl acrylate copolymer
  Solubility parameter 8.9
Vestolen A 4516—high density polyethylene
  Solubility parameter 7.9–8.0

DYNH—Low density polyethylene
Solubility parameter 7.9–8.0
Surlyn A 1707—Ionomer based on copolymer of ethylene methacrylic acid
Solubility parameter 8.9

The thermoplastic polymer, antimony trioxide, dechlorane and Crodamine IHT were loaded into the mixer and mixed at a room temperature for 30 seconds. The Vamac N123 was then added and the mix worked until it gelled at approximately 140° C. Next carbon black was added and mixing continued for 4 minutes with cooling. Triallyl cyanurate was then added, mixed for 45 seconds, and the mix dropped onto a mill at 50° C. and sheeted off. Finally, the compositions were extruded and irradiated with a dose of 12 Mrads and tested for oil resistance at elevated temperature.

The results are given in Table 1:

TABLE 1

| Thermoplastic | Physical Properties | | Properties after Immersion in ASTM Oil. No. 2 at 90° C. for 168 hrs. | | |
|---|---|---|---|---|---|
| | Tensile Strength at RT kg/cm$^2$ | Elongation % at RT | Tensile Strength at RT kg/cm$^2$ | Elongation % at RT | Weight Uptake % |
| Hytrel 4055 | 120 | 530 | 94 | 400 | 20.3 |
| DPD 6181 | 132 | 160 | 64.4 | 395 | 86.7 |
| Vestolen A 4516 | 120 | 140 | 82.8 | 395 | 70.6 |
| DYNH | 133 | 175 | 65 | 380 | 95.5 |
| Surlyn A 1707 | 181 | 110 | 153 | 420 | 35.9 |

From Table 1 it can be seen that only the composition containing Hytrel 4055 had an oil uptake of less than 30% by weight under the test conditions. In addition it was suprisingly found that the formulation containing Hytrel 4055 was much easier to process than the other formulations, did not stick to the surfaces of the mixer or the mill, and could be gelled at 95° C. Similar results were obtained when the loading of Hytrel 4055 in the formulation was reduced to 20% by weight.

EXAMPLE 2

This Example describes the production of a heat shrinkable article according to the invention.

A composition prepared according to Example 1 containing Hytrel 4055 was extruded in the form of a tube of internal diameter 6 mm and wall thickness of 1.5 mm and irradiated with a dose of 12 Mrad. The tube was then heated to 170° C. and expanded to an internal diameter of 12 mm using a mandrel. After cooling the tube was removed from the mandrel and retained its new shape. Heating the tube to 170° C. caused it to return to its original configuration.

EXAMPLE 3

The following compositions were blended using a laboratory Banbury internal mixer (all parts are by weight):
Vamac N123: 30
Carbon black: 2
Antimony trioxide: 6
Decabromodiphenyl ether: 12
Crodamine IHT (release agent): 0.375
Triallyl cyanurate: 1
Irganox 1010 (antioxidant): 0.375
Whiting (calcium carbonate): 16
Thermoplastic polymer: 30
Stabiliser (for Hytrel blend only): 2.25

The following thermoplastic polymers were used in the formulations:
Hytrel 4056—block copolymer of polytetramethylene ether with poly (tetramethyleneterephthalate)
Solubility parameter 9.3
Manolene 5203—high density polyethylene (melt index 0.15)
Solubility parameter 7.9–8.0 (Phillips)

The thermoplastic polymer, Vamac N123 and Irganox 1010 were loaded into the mixer and mixed at room temperature for 1 minute. The carbon black, antimony trioxide, decabromodiphenyl ether and calcium carbonate were then added and mixed until the temperature of the mix rose to 140° C. Crodamine 1HT and triallyl cyanurate were then introduced and mixed in for 45 seconds. This mix was then put onto a mill and sheeted off. Compression moulded plaques were made from the sheeted material and irradiated at 12 Mrads. The plaques were tested for oil resistance at elevated temperatures.

The results are given in Table 2:

TABLE 2

| Thermoplastic | Physical Properties | | Properties after Immersion in ASTM Oil. No. 2 at 90° C. for 168 hrs. | | |
|---|---|---|---|---|---|
| | Tensile Strength at RT MPa | Elongation % at RT | Tensile Strength at RT MPa | Elongation % at RT | Weight Uptake % |
| Hytrel | 8.5 | 320 | 10.1 | 330 | 5.4 |
| Manolene 5203 | 12.2 | 250 | 12.1 | 250 | 6.0 |

These results show the excellent oil resistance obtained using compositions according to the invention.

In some cases the results obtained are an order of magnitude better than those obtained in Example 1, and this is believed to be due to optimisation of the ratio of the polymers, and improved mixing, leading to better homogeneity of all blends.

For the purposes of comparison, the procedure of Example 2 was repeated using Hytrel 4056 as the thermoplastic polymer and Intolan 255, an ethylene-propylene-non-conjugated diene terpolymer manufactured by International Synthetic Rubber as the elastomer. After immersion in ASTM Oil No. 2 at 90° C. for 168 hours this blend was found to have a weight uptake of 45%, showing that blends containing hydrocarbon elastomers are greatly inferior to the blends of the present invention.

EXAMPLE 4

The procedure of Example 3 was repeated using Hytrel 4056 as the thermoplastic polymer and Vynathene EY 907, an ethylene-vinyl acetate copolymer containing 60% by weight of vinyl acetate manufactured by National Distillers & Chemicals as the elastomer. The solubility parameter of Vynathene EY 907 is 8.5.

The results are as follows:

| Physical Properties | | Properties after Immersion in ASTM Oil No. 2 at 90° C. for 168 hrs. | | |
|---|---|---|---|---|
| Tensile Strength at RT MPa | Elongation % at RT | Tensile Strength at RT MPa | Elongation % at RT | Weight Uptake % |
| 12.9 | 440 | 10.4 | 400 | 8.8 |

EXAMPLE 5

The procedure of Example 3 was repeated using a variety of blends of elastomers and thermoplastic polymers, and the resultant samples subjected to a thermal shock test (4 hours at 200° C.) and to a diesel oil resistance test (24 hours immersion at 90° C.). The results are given in Tables 3 and 4.

TABLE 3

| Elastomer | Thermoplastic | Tensile Strength at RT (MPa) | Elongation % at RT | Heat Shock 4 hrs at 200° C. | |
|---|---|---|---|---|---|
| | | | | Tensile Strength at RT (MPa) | Elongation % at RT |
| Vynathene EY907 | Hytrel 4056 | 12.3 | 460 | 5.5 | 220 |
| Vamac N123 | Hytrel 4056 | 12.8 | 430 | 10.3 | 310 |
| Vamac N123 | Manolene 5203 | 18.9 | 295 | 12.5 | 230 |
| Vamac N123 | Surlyn 1560* | 15.3 | 275 | 18.3 | 165 |

*Surlyn 1560 - ionomer based on copolymer of ethylene and methacrylic acid, Solubility parameter 8.9 (Du Pont)

TABLE 4

| Elastomer | Thermoplastic | Weight uptake % after Immersion in Diesel Oil at 90° C. for 24 hrs |
|---|---|---|
| Vynathene EY907 | Hytrel 4056 | 23.1 |
| Vamac N123 | Hytrel 4056 | 15.8 |
| Vamac N123 | Manolene 5203 | 12.9 |
| Vamac N123 | Surlyn 1560* | 38.4 |

*Surlyn 1560 - ionomer based on copolymer of ethylene and methacrylic acid, Solubility parameter 8.9 (Du Pont)

The results once more show the compositions of the invention to have good resistance to hydrocarbon solvents and good retention of physical properties on thermal ageing. In particular, they demonstrate the excellent results obtained with blends containing a segmented polyether ester copolymer or a linear (high density) polyethylene as the thermoplastic polymer.

EXAMPLE 6

The procedure of Example 3 was repeated using Vamac N123 as the elastomer and a variety of grades of polyethylene as the thermoplastic polymer. Samples of the blends were tested for heat shock resistance (4 hours at 200° C.) and for resistance to ASTM oil no. 2 and diesel oil by immersion in the fluids for 24 hours at 90° C. The results are given in Tables 5 and 6.

TABLE 5

| Thermoplastic Polymer | Physical Properties | | Physical Properties after 4 hrs at 200° C. | |
|---|---|---|---|---|
| | Tensile Strength at RT (MPa) | Elongation % at RT | Tensile Strength at RT (MPa) | Elongation % at RT |
| DYNH low density branched polyethylene | 9.6 | 385 | 9.7 | 260 |
| *Sclair resin melt index 5 density 0.922 | 11.3 | 410 | 11.2 | 350 |
| Sclair resin melt index 5 density 0.930 | 9.0 | 360 | 10.8 | 315 |
| Sclair resin melt index 2.7 density 0.932 | 13.5 | 430 | 11.4 | 340 |
| Sclair resin melt index 2.7 density 0.937 | 10.5 | 340 | 10.7 | 210 |
| Sclair resin melt index 3.3 density 0.950 | 9.9 | 215 | 10.7 | 81 |
| Sclair resin melt index 3.3 density 0.922 | 12.9 | 455 | 10.2 | 255 |
| Manolene 5203 | 13.9 | 295 | 12.5 | 230 |

TABLE 6

| Thermoplastic Polymer | Weight Uptake % After 24 hrs at 90° C. | |
|---|---|---|
| | ASTM Oil No. 2 | Diesel Oil |
| DYNH | 16 | 14 |
| *Sclair resin (MI 5 density 0.922) | 7.8 | 40 |
| Sclair resin (MI 5 density 0.930) | 5.0 | 25 |
| Sclair resin (MI 2.7 density 0.932) | 5.2 | 24 |
| Sclair resin (MI 2.7 density 0.937) | 3.7 | 19 |
| Sclair resin (MI 2.7 density 0.950) | 3.6 | 16 |
| Sclair resin (MI 3.3 density 0.922) | 8.5 | 35 |
| Manolene 5230 | 2.9 | 13 |

*Sclair resin are linear low density polyethylenes manufactured by Du Pont.

These results are further proof of the excellent properties obtained using compositions according to the invention. In particular they demonstrate the unexpected further improvement obtained when substituting a linear polyethylene (Sclair or Manolene) for a branched polyethylene (DYNH).

I claim:

1. A polymer composition which comprises a crosslinked blend of an elastomer and a thermoplastic polymer, the elastomer comprising a polymer of ethylene with an ethylenically unsaturated aliphatic ester, the elastomer and the thermoplastic polymer being substantially free of halogen-containing substituents, the elastomer and the thermoplastic polymer being present in a weight ratio of from 2.5:1 to 1:2.5, wherein the thermoplastic polymer comprises a segmented copolyester polymer consisting essentially of recurring intralinear long chain ester units and short chain ester units randomly joined head-to-tail through ester linkages, said long chain ester units being represented by the formula:

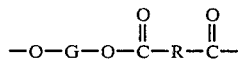

and said short chain ester units being represented by the formula:

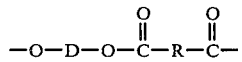

where G is divalent radical remaining after the removal of terminal hydroxyl groups from at least one long chain glycol having a molecular weight of from 600 to 6000; R is a divalent radical remaining after removal of carboxyl groups from at least one dicarboxylic acid having a molecular weight of less than 300; and D is a divalent radical remaining after removal of hydroxyl groups from at least one low molecular weight diol having a molecular weight of less than 250.

2. A composition according to claim 1, in which the elastomer is selected from an ethylene/acrylic ester polymer or an ethylene/vinyl acetate polymer, in which the polymer contains at least 3.6 moles of ethylene per 1000 gms of polymer.

3. A composition according to claim 1, in which the elastomer is selected from the group consisting of:
   (a) an ethylene/alkyl acrylate or ethylene/alkyl methacrylate copolymer wherein the alkyl group has 1 to 4 carbon atoms; the proportion of the acrylic ester being equivalent to from 2.4 to 8.0 moles of ester groups per 1000 gms of the copolymer or
   (b) a terpolymer of ethylene with an alkyl acrylate or methacrylate wherein the alkyl group has from 1 to 4 carbon atoms, and a third copolymerizable monomer selected from;
      i a $C_1$–$C_{12}$ alkyl monoester or diester of a butenedioic acid,
      ii acrylic acid,
      iii methacrylic acid,
      iv carbon monoxide,
      v acrylonitrile,
      vi a vinyl ester,
      vii an alkyl acrylates or alkyl methacrylate, the alkyl group having at least 5 carbon atoms,
      viii maleic anhydride;
   the proportion of the acrylic ester being equivalent to from 2.5 to 8.0 moles of ester groups per 1000 gms of the polymer, and the proportion of the third monomer being not higher than 10 weight percent of the polymer, or
   (c) an ethylene/vinyl acetate copolymer containing at least 35% by weight vinyl acetate.

4. A composition according to claim 1, in which the elastomer comprises a terpolymer of ethylene, methyl acrylate and a monomer comprising a reactive carboxyl group.

5. A composition according to claim 1, in which the elastomer has a melt index of from 0.5 to 15 as measured by ASTM method No. D-1238-52T.

6. A composition according to claim 1, in which the thermoplastic polymer comprises a segmented polyether ester copolymer derived from terephthalic acid, polytetramethylene ether glycol and 1,4-butanediol, having the repeating units

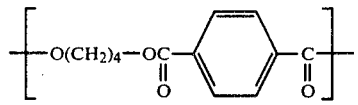

and

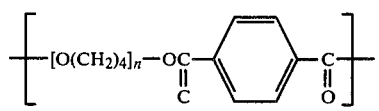

in which n=6 to 40.

7. A composition according to claim 1, in which the solubility parameter of the elastomer is greater than 9.

8. A composition according to claim 1, in which the solubility parameter of the elastomer and the thermoplastic polymer differ by no more than 0.5.

9. A composition according to claim 1, in which the elastomer is an ethylene/acrylic ester polymer, the elastomer and thermoplastic polymer being present in the proportion of from 50 to 150 parts by weight of the ethylene/acrylic ester elastomer per 100 parts by weight of the segmented copolyester thermoplastic polymer.

10. A crosslinked composition according to claim 1, having an oil uptake of 10% or less by weight then immersed in ASTM Oil No. 2 at a temperature of 90° C. for 168 hrs.

11. A polymer composition which comprises a crosslinked blend of an elastomer and a thermoplastic polymer, the elastomer comprising a copolymer of ethylene, methyl acrylate and a cure-site monomer comprising carboxyl groups, and the thermoplastic polymer comprising a segmented polyether ester copolymer derived from terephthalic acid, polytetramethylene ether glycol and 1,4-butandiol having the repeating units;

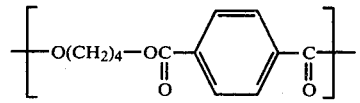

and

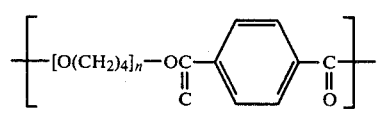

in which n=6 to 40, the elastomer and the thermoplastic polymer being substantially free of halogen-containing substituents, wherein the elastomer and the thermoplastic polymer are present in a weight ratio of from 2.5:1 to 1:2.5.

* * * * *